Aug. 12, 1947.      J. N. WOLFRAM      2,425,662
FLEXIBLE COUPLING
Filed Nov. 21, 1944

Inventor
John N. Wolfram
By Mason, Porter & Diller
Attorneys

Patented Aug. 12, 1947

2,425,662

UNITED STATES PATENT OFFICE 2,425,662

FLEXIBLE COUPLING

John N. Wolfram, Cleveland, Ohio, assignor to The Parker Appliance Company, Cleveland, Ohio, a corporation of Ohio Application November 21, 1944, Serial No. 564,461

4 Claims. (Cl. 285—90)

The present invention relates generally to tube couplings and more particularly to improvements in couplings for flexibly clamping the end of a metal tube.

An important object of the invention is to provide a flexible coupling for tubes including threadedly engaged body and nut members defining therebetween an annular chamber for deformable packing members, with inner and outer metal sleeves surrounding the tube for housing the packing members.

Another object of the invention is to provide a coupling of the above character wherein a pair of packing members are employed, one of which is maintained out of contact with the tube and the other is deformed thereagainst upon relative movement of the packing members toward one another to provide an effective seal and floating connection for the tube.

A further object of the invention is to provide a coupling of the above character wherein damage to the packing members, due to pull out strains imposed on the tube, is prevented by engagement of the tube with one or the other of the sleeves.

The above and other objects of the invention will in part be obvious and will be hereinafter more fully pointed out.

Figure 1:
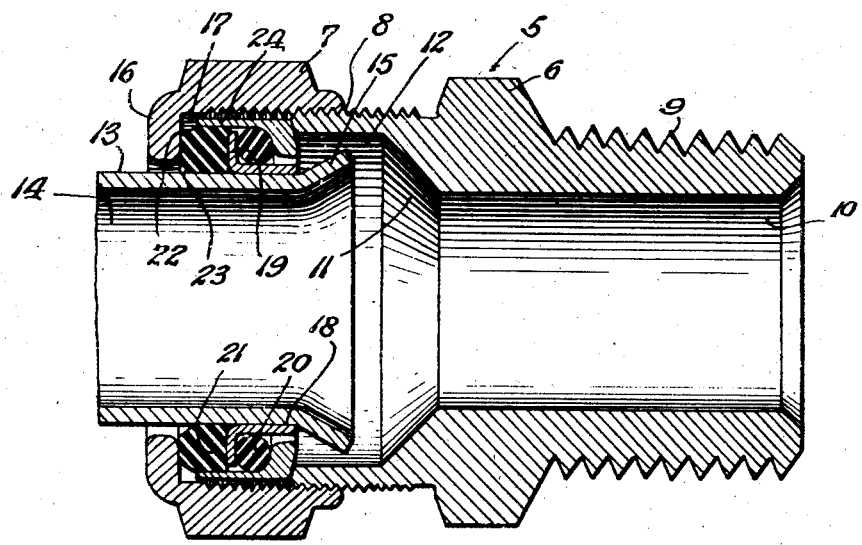
Figure 1 is a longitudinal view in section, showing the coupling with the tube inserted before the coupling members have been tightened relative to one another.

Referring more in detail to the accompanying drawing, the new and improved flexible coupling is generally designated by the reference numeral 5 and includes a body member 6, and nut 7 which threadedly engage one another, as at 8. The body member 6 is provided with the threaded portion 9 for engagement with a member, not shown, with which the tube is to be connected. The body member 6 is formed with a central bore 10, and an annular recess 11 and is further formed with a counterbore 12 in communication with the annular recess 11.

A metal tube 13 having a central bore 14 of substantially the same diameter as the bore 10 is adapted to be disposed within the counterbore 12, the tube 13 being of the type in which the inner end is enlarged by the formation of a flared end 15. It is, of course, to be understood that a bead or any other type of enlargement can be formed on the tube within the meaning of the present invention.

The nut 7 is formed with an inwardly directed shoulder 16, and said nut when threadedly engaged with the body member 6, defines therebetween an annular chamber 17 for receiving the flexible clamping elements. Closely surrounding the tube 13 within the region of the flared end 15 there is a metal sleeve 18 provided with an annular flange 19, said sleeve adapted to have positioned thereon a deformable packing ring 20 of rubber or similar material. The sleeve 18 is substantially L-shaped in cross section and the packing ring 20 is disposed thereon so as to closely engage the flange 19 as well as the body of the sleeve, as is clearly shown in Figure 1 of the drawing.

Figure 2:
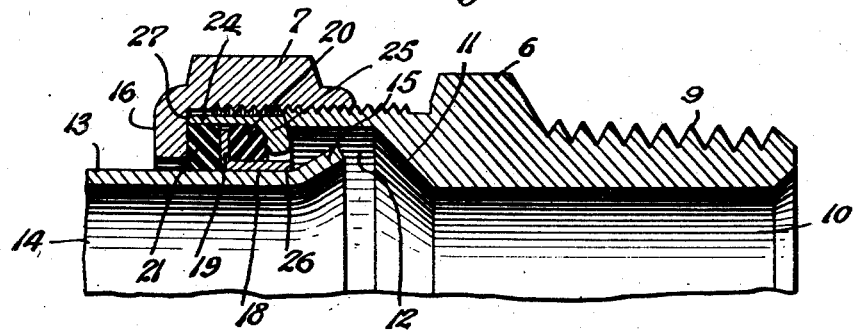
Figure 2 is a similar view in section, showing the flexible coupling after the coupling members have been tightened relative to one another.

Surrounding the tube 13 and disposed on the other side of the sleeve flange 19 is a second packing member 21, of rubber or similar material, and it will be noted from Figure 1 of the drawing that the packing member 21 differs in shape and size from the packing ring 20. In the formation of the member 21 its corners are preferably cut away as indicated at 22 and 23 so that when it is deformed by tightening of the nut 7 on the body member 6, the material can be deformed without damage thereto caused by pinching or the like. The manner in which packing member 21 is deformed upon tightening of the nut is shown in Figure 2 wherein it has assumed a substantially rectangular shape.

Also disposed within the annular chamber and substantially surrounding the packing members 20 and 21, is a second metal sleeve 24 formed with an inwardly extending annular flange 25 which is adapted to engage the inner end of the body member 6 when the parts are initially assembled as shown in Figure 1. The side of the sleeve 24 opposite the flange 25 is normally spaced from the shoulder 16 in this position. Provision of the sleeve 24 substantially houses the packing ring 20 since it is confined between the flanges 19 and 25, and likewise the packing member 21 is confined between the flange 19 and the sleeve 24 on two sides and between the shoulder 16 and tube 13 on its other two sides.

The position of the tube 13 and the coupling members before the coupling members are tightened relative to one another is shown in Figure 1. In this position the flared end 15 of the tube 13 has been inserted within the counterbore 12 with the sleeves and packing members in position thereon. When the nut 7 is tightened on the body member 6 both packing members will be subjected to a radial squeeze, there being but slight deformation of the packing ring 20, while the packing member 21 will be deformed to a degree sufficient to fill the space in the annular chamber 17 created by the cut-away portions 22 and 23 of said packing member. This is clearly shown in Figure 2. However, the packing member 21 is so shaped as to prevent excessive pinching and extrusion when the coupling members are tightened. When the coupling members are finally tightened, the parts will assume the positions shown in Figure 2.

The new and improved coupling including the pair of deformable packing members, and pair of sleeves, provides for a metal to metal seal between the outer sleeve 24 and body member 6, and a rubber seal between the inner and outer sleeves 18 and 24 and the tube 13. The inner sleeve 18 closely surrounding the tube minimizes wear at 26 when the tube is flexed, and this flexing of the tube is permitted due to its contact with the flexible packing member 21. Damage to the packing member 21 caused by severe pull out strains imposed on the tube will be prevented by engagement of the flared end 15 with the inwardly directed flange 25 of the outer sleeve 24. Any assembly stress on either or both of the packing members will be limited by the positive engagement of the nut shoulder 16 with the sleeve 24 at 27. The metal tube 13 is thus securely coupled while being permitted to vibrate or flex slightly in its rubber mounting without causing undue strain on the tube itself or on the coupling parts.

It is to be clearly understood that various changes in the details and construction and arrangement of parts may be made without departing from the scope of the invention as set forth in the appended claims.

I claim:

1. A flexible coupling for tubes comprising a pair of relatively movable coupling members threadedly engaging one another and defining therebetween an annular chamber, a pair of deformable packing members surrounding the tube and positioned within said annular chamber, an inner sleeve surrounding said tube and contacting therewith, an outer sleeve surrounding the deformable packing members and said inner sleeve, said sleeves being spaced from each other and one of said sleeves having a laterally projecting flange for separating the deformable packing members.

2. A flexible coupling for tubes comprising a pair of relatively movable coupling members threadedly engaging one another and defining therebetween an annular chamber, a sleeve mounted on the tube adjacent the inner end thereof and having an outwardly projecting flange, a pair of deformable packing members surrounding the tube and held in spaced relation by the flange on said sleeve and a second sleeve surrounding said first sleeve and deformable packing members, said sleeves being spaced from each other whereby said tube is supported in said coupling by said deformable packing members.

3. A flexible coupling for tubes comprising a pair of relatively movable coupling members threadedly engaging one another and defining therebetween an annular chamber, a sleeve mounted on the tube adjacent the inner end thereof and having an outwardly projecting flange, a pair of deformable packing members surrounding the tube, one of said packing members being maintained out of contact with the tube by said sleeve, the flange on said sleeve serving to separate said deformable packing members and a second sleeve surrounding said first sleeve and packing members, said sleeves being spaced from each other whereby said tube is supported in said coupling by said deformable packing members.

4. A flexible coupling for tubes comprising a pair of relatively movable coupling members threadedly engaging one another and defining therebetween an annular chamber, a sleeve mounted on the tube in the region of the inner end thereof, an annular flange on said sleeve extending outwardly of the tube, a deformable packing member positioned on said sleeve and in contact with one side of said flange, a second deformable packing member surrounding the tube and in contact with the other side of said flange, and a second sleeve surrounding said first sleeve and packing members and having a flange extending inwardly toward the tube and in bearing engagement with the first packing member.

JOHN N. WOLFRAM.

REFERENCES CITED

The following references are of record in the file of this patent:

UNITED STATES PATENTS

| Number | Name | Date |
|---|---|---|
| 2,300,584 | Martin | Nov. 3, 1942 |
| 516,216 | McKim | Mar. 13, 1894 |
| 1,001,364 | Dayton | Aug. 22, 1911 |
| 2,354,538 | Parker | July 25, 1944 |